United States Patent [19]

van der Lely

[11] 4,185,445
[45] Jan. 29, 1980

[54] MOWING MACHINE

[76] Inventor: Cornelis van der Lely, 7 Bruschenrain, Zug, Switzerland

[21] Appl. No.: 790,687

[22] Filed: Apr. 25, 1977

[30] Foreign Application Priority Data

Apr. 27, 1976 [NL] Netherlands .......................... 7604451

[51] Int. Cl.² ...................... A01D 55/00; A01D 57/26
[52] U.S. Cl. .......................................... 56/6; 56/13.6; 56/14.5; 56/192; 56/DIG. 1
[58] Field of Search ................. 56/DIG. 1, 6, 7, 13.5, 56/13.6, 13.7, 13.8, 13.9, 14.3, 14.5, 14.6, 15.4, 15.6, 192, 122, 123, 295, 296

[56] References Cited

U.S. PATENT DOCUMENTS

| | | | |
|---|---|---|---|
| 2,782,585 | 2/1957 | Hervey | 56/13.6 |
| 2,811,003 | 10/1957 | Getz | 56/192 |
| 2,911,780 | 11/1959 | Brady | 56/192 |
| 3,157,014 | 11/1964 | Bottenberg | 56/192 |
| 3,177,678 | 4/1965 | Johnson | 56/7 |
| 3,262,254 | 7/1966 | van der Lely et al. | 56/13.6 |
| 3,338,036 | 8/1967 | Hurlburt | 56/192 |
| 3,389,539 | 6/1968 | Zweegers | 56/13.6 |
| 3,412,536 | 11/1968 | Drummond | 56/13.5 |
| 3,503,190 | 3/1970 | van der Lely | 56/13.6 |
| 3,513,645 | 5/1970 | Garrett et al. | 56/DIG. 1 |
| 3,608,286 | 9/1971 | Lausch et al. | 56/DIG. 1 |
| 3,650,096 | 3/1972 | Caldwell | 56/7 |
| 3,654,750 | 4/1972 | van der Lely | 56/192 |
| 3,669,194 | 6/1972 | Zurek | 56/15.4 |
| 3,717,981 | 2/1973 | van der Lely | 56/6 |
| 3,733,796 | 5/1973 | Wood et al. | 56/DIG. 1 |
| 3,754,384 | 8/1973 | Case et al. | 56/192 |
| 3,841,070 | 10/1974 | Scarnato et al. | 56/192 |
| 3,881,301 | 5/1975 | Sawyer et al. | 56/192 |
| 3,893,283 | 7/1975 | Dandl | 56/6 |
| 4,048,790 | 9/1977 | Zweegers | 56/192 |

*Primary Examiner*—Louis G. Mancene
*Assistant Examiner*—Paul J. Hirsch
*Attorney, Agent, or Firm*—Mason, Mason and Albright

[57] ABSTRACT

A mowing machine has mowing units that are connected to a tractor's three point lifting device or devices at the front and/or rear side of the tractor. The units can be pivoted to an intermediate frame portion to extend laterally of that portion and hydraulic assemblies are connected to pivot each unit to a raised inoperative or transport position. The units each include a respective reciprocating cutter bar, and a crushing device with guides to move cut crop to the device. A drum mower can be positioned between the cutter bars. In another arrangement, a further unit can be attached at the front, with respect to the direction of machine travel. The frame portion includes beams that can form a sliding support for the frame portion and the units pivoted to that portion. Each unit can have vertical side walls and a driving transmission. Swath boards on the rear of each portion guide crop away from the tractor wheels.

5 Claims, 10 Drawing Figures

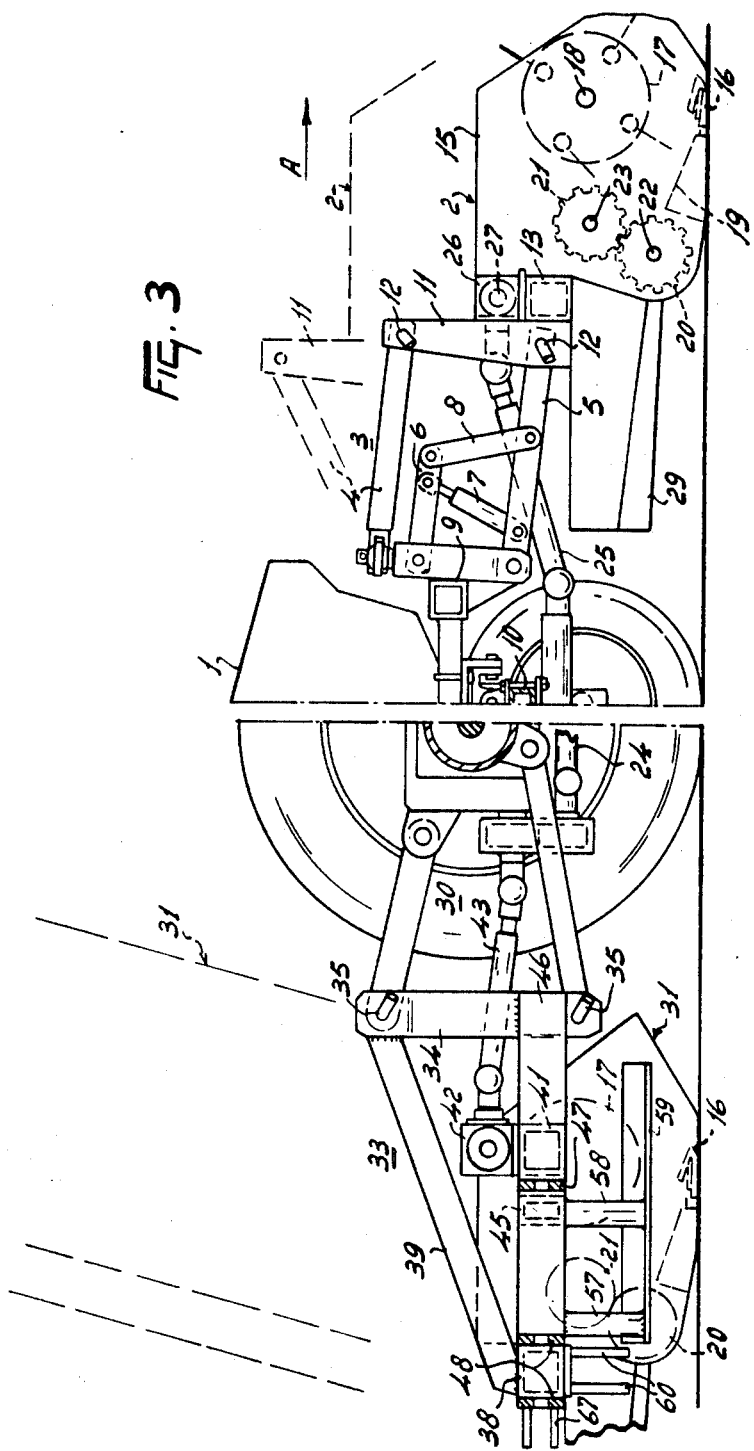

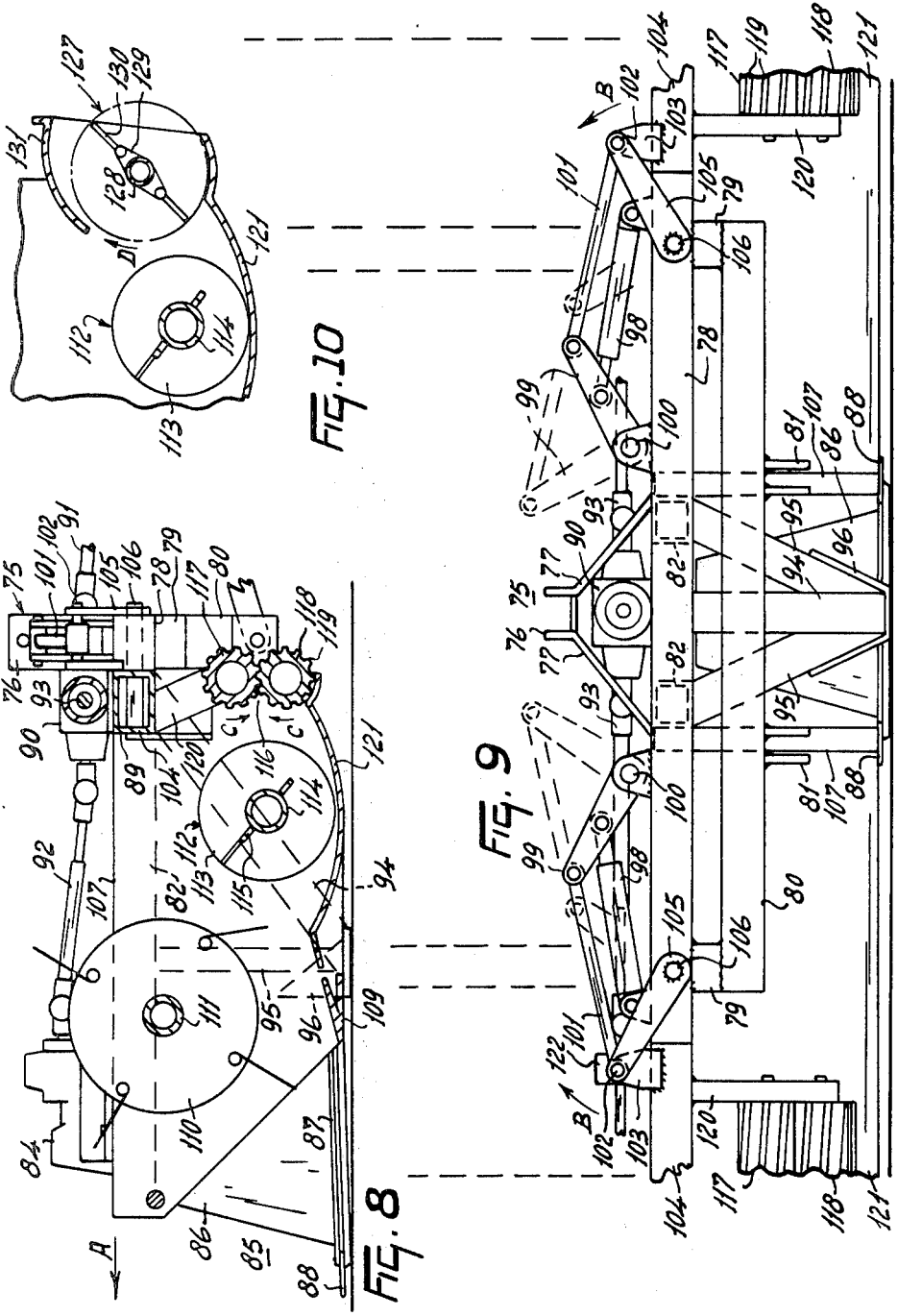
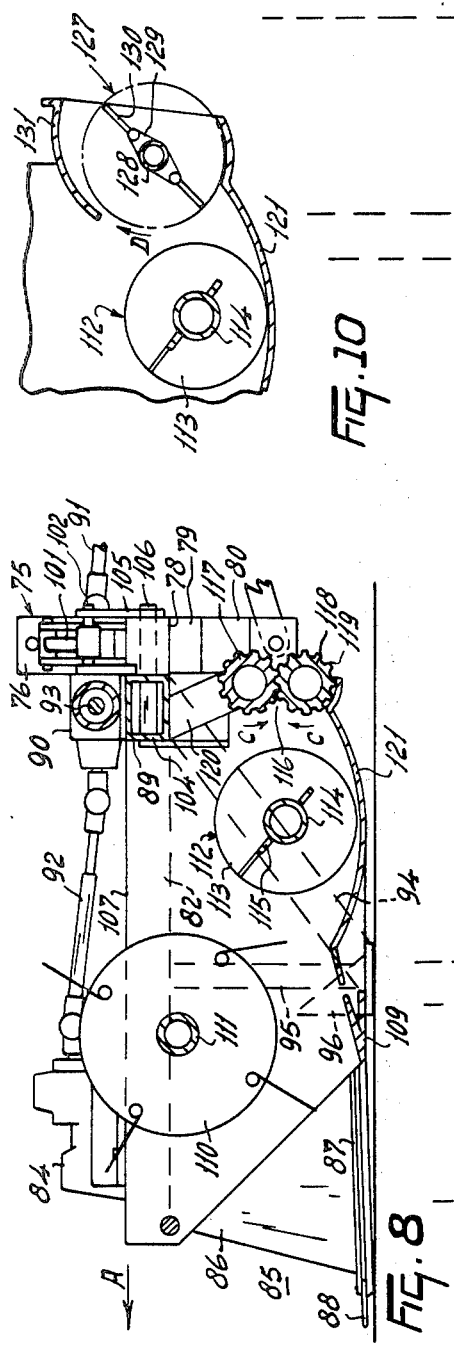

MOWING MACHINE

SUMMARY OF THE INVENTION

According to a first aspect of the present invention there is provided a mowing machine provided at the rear side with coupling means for attaching the mowing machine to a three-point linkage at the front of a conventional series-production tractor, the mowing machine comprising at least one cutting element and a crushing member located behind the cutting element, with respect to the intended direction of travel of the mowing machine, for crushing cut crop.

According to a second aspect of the present invention there is provided a mowing machine, having a cutting element in the form of a cutter bar, and a mowing member mounted for rotation about an upright axis adapted to displace cut crop to the cutter bar.

According to a third aspect of the present invention there is provided a mowing arrangement comprising an intermediate frame on which is supported at least one mowing machine in accordance with the said first aspect or the said second aspect or both.

For a better understanding of the invention and to show how the same may be carried into effect, reference will be made by way of example to the accompanying drawings, in which:

BRIEF DESCRIPTION OF THE DRAWINGS

FIG. 3 is a partly sectional view taken on the line III—III in FIG. 2;

FIG. 4 is a rear view of part of the combination taken in the direction of the arrow IV in FIG. 2;

FIG. 8 is a sectional view taken on the lines VIII—VIII in FIG. 7;

FIG. 9 is a view taken in the direction of the arrow IX in FIG. 7;

FIG. 10 shows a modification of part of the mowing machine shown in FIG. 8.

DESCRIPTION OF THE PREFERRED EMBODIMENTS

Figure 1:
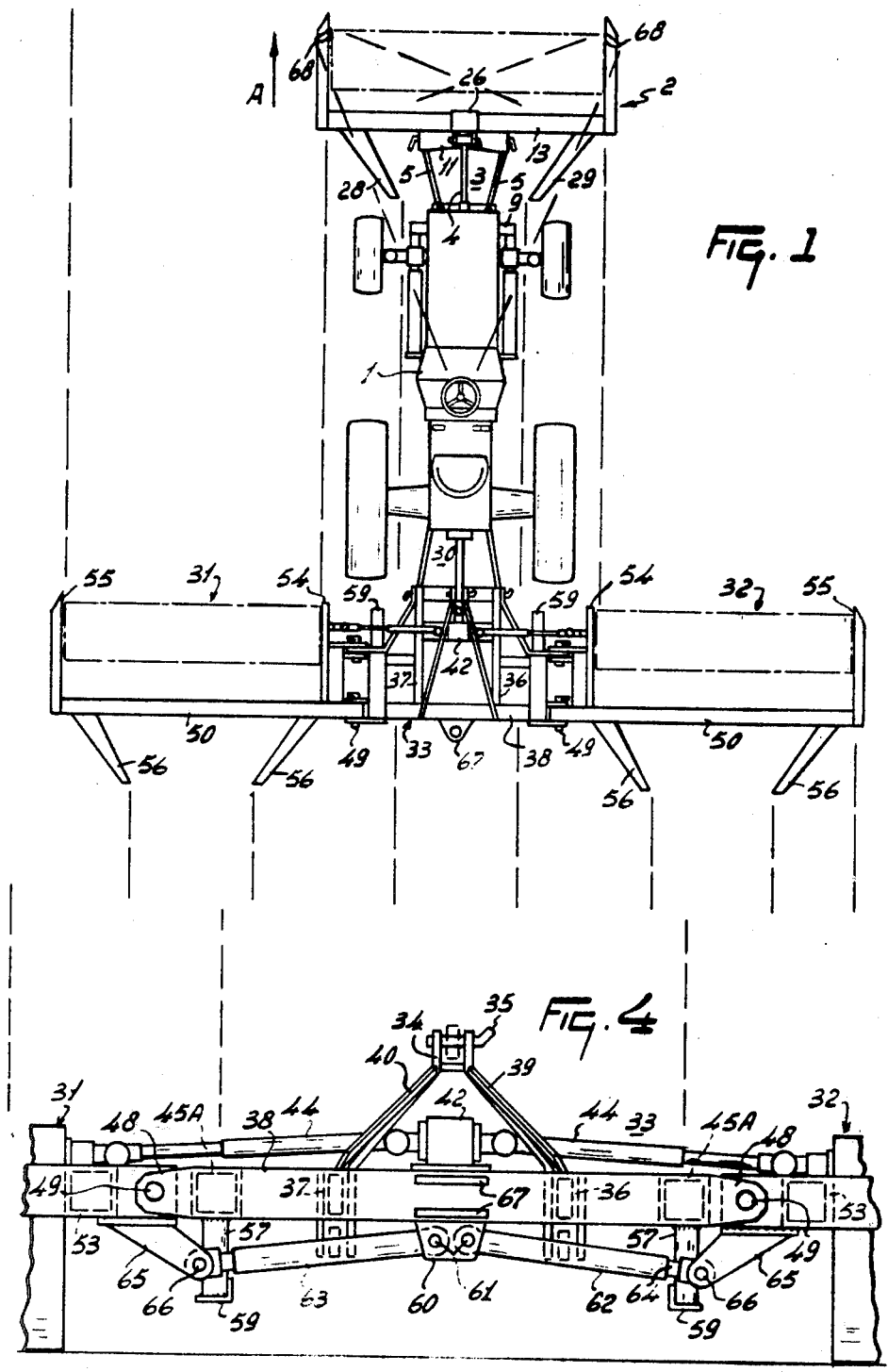
FIG. 1 is a plan view of a first embodiment comprising a tractor in combination with three mowing machines.
Figure 2:
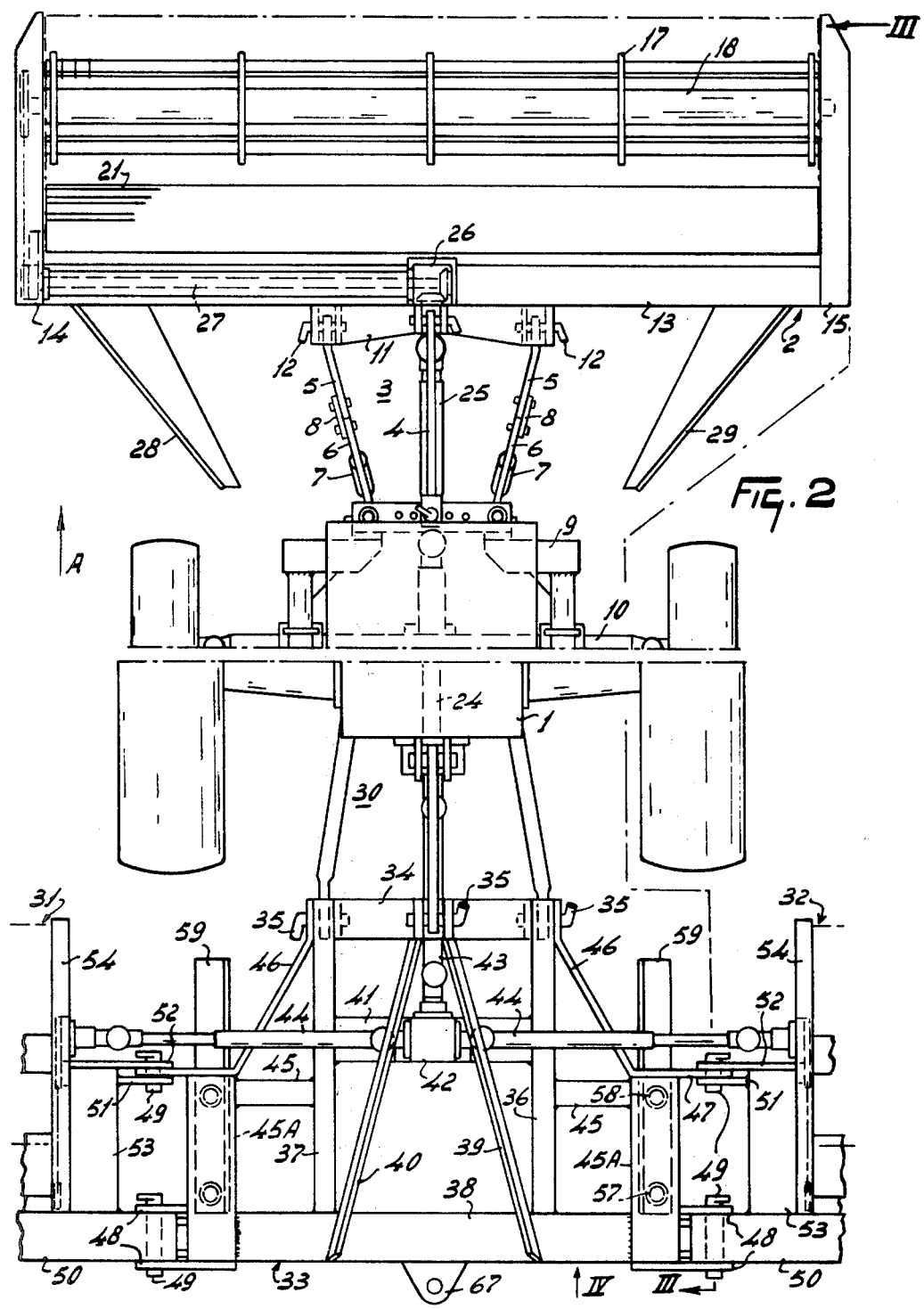
FIG. 2 is an enlarged plan view of part of the combination shown in FIG. 1.

Referring to FIGS. 1 to 4, at the front of a tractor 1 a mowing machine 2 is attached to a three-point lifting device 3 comprising a top rod 4 and two lower arms 5. The three-point lifting device 3 furthermore comprises two lifting arms 6, which act, with two intermediate arms 8, to lift the lower arms 5 when hydraulic cylinders 7 are actuated. The three-point lifting device 3 includes a frame 9 which is connected to the front axle 10 of the tractor so that the lifting device (and the mowing machine 2 coupled therewith) can follow the movements of the front axle with respect to the ground independently of the chassis of the tractor 1. The front axle 10 of the tractor is freely pivotable with respect to the tractor chassis about a horizontal pivot axis extending parallel to the direction of movement A. The mowing machine 2 is supported on a trestle 11 which is connected by pins 12 to the arms of the three-point lifting device 3. To the front, with respect to the intended direction of travel A, and towards the bottom of the three-point trestle 11 is secured a substantially horizontal hollow supporting beam 13, extending transversely of the intended direction of travel A beyond the track width of the tractor 1. At the two ends of the beam 13 remote from the trestle 11 the mowing machine 2 is provided with generally vertical walls 14 and 15, extending parallel to the direction A. With respect to the direction A the wall 14 is disposed on the left-hand side and the wall 15 on the right-hand side of the trestle 11. The walls 14 and 15 terminate near the front, viewed in plan, in a point, so that they may serve, in use of the mowing machine, as crop dividers. The walls 14 and 15 support near the bottom and at the front a substantially horizontal cutting element 16 comprising a cutter bar having substantially horizontal, reciprocatory cutters (FIG. 3). Above the cutting element 16 a reel 17 is mounted for rotation about a rotary shaft 18. The rotary shaft 18 is supported in bearings in the walls 14 and 15. Behind the cutting element 16 a guide wall 19 extends rearwardly and upwardly with respect to the direction A. In the space enclosed by the walls 14 and 15 and adjacent the wall 19 is accommodated a crop crushing member comprising two crushing rollers 20 and 21, which are adapted to rotate in mutually opposite senses on respective shafts 22 and 23, which are supported by bearings in the walls 14 and 15. In the side elevation of FIG. 3 the shaft 23 is disposed, with respect to the direction A, in front of and obliquely above the shaft 22. The crushing rollers 20 and 21 cover the whole width of the cutter bar 16A and have ribbed surfaces of flexible material, such as rubber.

The mowing machine 2 is driven by an auxiliary shaft 24 from the power take-off shaft of the tractor located at the rear, the auxiliary shaft 24 being coupled near the front of the tractor through an auxiliary shaft 25, with a gear box 26 on top of the beam 13; via bevel gears the gear box drives a laterally extending output shaft 27, which is journalled in the wall 14, which serves as a housing for pulleys arranged on the shafts 18, 22 and 23 for driving through one or more driving belts the reel 17 and the crushing rollers 20 and 21. Moreover, the shaft 27 drives, in a manner not shown, the reciprocatory cutters of the cutter bar 16.

On the underside of the beam 13 are fastened swath boards 28 and 29, which converge rearwardly, with respect to the direction A, from near the walls 14 and 15 to a width which is smaller than the distance between the tractor wheels. The upwardly extending swath boards 28 and 29 are preferably bent inwardly in an inclined position near the bottom side.

At the rear of the tractor 1 a three-point lifting device 30 has attached to it a mowing arrangement comprising two mowing machines 31 and 32, which are largely similar to the mowing machine 2, and an intermediate frame 33, so that with respect to the direction A the mowing machines 31 and 32 extend laterally of the tractor 1. The mowing machines 31 and 32 thus operate over strips of soil adjoining the strip over which the mowing device 2 operates. The working width of each mowing machine is about 2.5 meters, and so the combination of the mowing machines 2, 31 and 32 has an overall working width of about 7.5 meters.

The intermediate frame 33 includes a three-point trestle 34 which is connected by pins 35 to the arms of the lifting device 30. Like the trestle 3 at the front of the tractor, the three-point trestle 34 also has a substantially triangular shape, as viewed in the direction A. Near the lower coupling points of the trestle 34 two hollow substantially horizontal supporting beams 36 and 37 extend from the trestle 34 to the rear and lie parallel to the direction A. The rear ends of the beams 36 and 37 are connected with a substantially horizontal hollow beam 38 which extends transversely of the direction A and which affords a support for the mowing devices 31 and 32, for which reason it is preferably fairly strong. From the topmost coupling point of the three-point lifting device 30 of the intermediate frame 33 two strips 39 and 40 diverge rearwardly and are downwardly inclined. Near their rear ends, the strips 39 and 40 are connected with the top side of the beam 38. Between the supporting beams 36 and 37 a transverse tie beam 41 extends substantially parallel to the beam 38. The top side of the beam 41 supports a gear box 42, which is coupled at the front with an auxiliary shaft 43 which extends forwardly and is connected with the power take-off shaft at the rear of the tractor, which is the same power take-off shaft as that to which the auxiliary shaft 24 is coupled. Auxiliary shafts 44 extending from the sides of the gear box 42 serve for driving the mowing machines 31 and 32 respectively.

Since the construction of the mowing machines 31 and 32 and their connection with the supporting beams 37 and 36 respectively are mirror-images of each other, only the construction to the right of the supporting beam 36 will be described.

To the side of the supporting beam 36 is welded an intermediate piece 45, which extends parallel to and in front of the beam 38. To the corresponding end of the beam 38 and to the intermediate piece 45 is welded a beam 45A extending parallel to the beam 36. A supporting strip 46 is welded to the front end of the beam 45A and extends outwardly from the beam 45A over a short distance to afford a tag 47, and extends inwardly at an angle of about 30° to the direction A and is welded near its front end to the beam 36 in the region of the trestle 34. The tag 47 extends transversely of the direction A and two further tags 48 are fastened to the rear end of the beam 45A and lie parallel to the tag 47. The tags 47, 48 have holes to receive pins 49, for attaching the mowing machine 32 to the intermediate frame 33.

At the rear, the mowing machine 32 has a hollow support 50, which lies between the tags 48 and is connected by one of the pins 49 to the intermediate frame 33. The support 50 covers substantially the whole width of the mowing machine. The mowing machine 32 is connected by one of the pins 49 with the tag 47 by means of a pair of parallel tags 51 and 52 arranged on a stiffening beam 53, which extends substantially horizontally in the direction A, its rear end being connected with the support 50. To the side of the stiffening beam 53 is secured a wall 54, the function of which corresponds with that of the wall 14 of the front mowing machine 2; however, in view of the local overlap between the mowing machines 2 and 32, the wall 54 does not have a sharp edge to form a crop divider at the front. The wall 54 supports in a manner not shown a cutting element which comprises a cutter bar like the mowing machine 2, a reel and crushing rollers. These components are furthermore supported by a wall 55 at the end of the beam 50 remote from the wall 54. The wall 55, like the walls 14 and 15, affords a crop divider at the front. At the rear of the mowing machine 32 swath boards 56 are fastened, like the boards 28 and 29.

On the bottom of the beam 45A are welded two downwardly extending pipes 57 and 58 (FIG. 3). The lower ends of the pipes 57 and 58 are provided with a generally horizontal angle-section member 59 extending forwardly from the pipe 57 and which projects in front of the pipe 58. The front end of the member 59 is preferably located just in front of the reel of the mowing machine 32 with respect to the direction of movement A.

Near the longitudinal plane of symmetry of the intermediate frame 33, on the bottom of the hollow beam 38, are fixed mutually parallel ears 60 which extend downwardly (FIG. 4). Pivotal shafts 61 are received in holes in the ears and constitute pivotal connections for hydraulic cylinders 62 and 63, which can be actuated from the tractor 1 and are arranged to turn the mowing machines 32 and 31 respectively about the pivotal axis afforded by the pins 49. The cylinders 62 and 63 are laterally and downwardly inclined away from the shafts 61 so that in operation of the mowing machines, the ground clearance near the ears 60 exceeds the ground clearance near the ends of the cylinders 62 and 63 remote from the ears 60. As before, it will be sufficient to describe the lifting device formed by the hydraulic cylinder 62 and the parts associated therewith. The piston rod 64 of the hydraulic cylinder 62 is pivotally connected by a pivotal shaft 66 with fork-shaped plates 65, which extend outwardly and upwardly over a short distance from the pivotal shaft 66, as shown in the elevational view of FIG. 4; the plates 65 are welded to the bottom of the support 50.

At the rear of the beam 38, near the longitudinal plane of symmetry of the intermediate frame 33, are welded two mutually parallel tags 67 having coupling points for attaching an agricultural machine to the rear of the intermediate frame 33, which machine may, if desired, be coupled with the aid of an auxiliary shaft (not shown) with the rear side of the gear box 42.

The mowing machines 31 and 32 are otherwise similar to the mowing machine 2.

The combination of the tractor 1 and the mowing machines 2, 31, 32 shown in FIGS. 1 to 4 operates as follows.

In operation the mowing machines 2, 31 and 32 are coupled with the aid of the pins 12 and 49 with the three-point lifting devices 3 and 30 at the front and the rear respectively of the tractor 1, which requires no special accessories. The tractor 1 is preferably of the conventional commercial type, that is to say, a standard tractor manufactured in series production. The mowing machines form part of the combination with the tractor 1 shown in FIG. 1 and can be moved by the tractor 1 in the direction of the arrow A. The cutting element, the reel and the crushing rollers located behind the cutting element of each mowing machine are driven from a central power take-off at the rear of the tractor by the auxiliary shafts 25, 43, 45, the gear boxes 26, 42 and V-belts. During a run of the combination, crop is cut over a large effective width by the cutting elements of the three mowing machines 2, 31 and 32 located side by side, with respect to the direction A and the crop is moved along the guide wall 19 by the tines of the reel 17 to the crushing rollers 20 and 21 located behind each cutting element. The crushing rollers are preferably urged towards one another by spring force and the surfaces are provided with ridges or ribs, for example, of rubber, and so the crop is crushed. In order to ensure a correct crushing effect without loss of crop the crushing rollers are driven at a comparatively low speed of, for example, about 700 rev/min. In order to feed the crop correctly from the cutting element the reel 17 is arranged so that its tines convey the crop from the cutting bar 16 via the guide wall 19 towards the nip between the crushing rollers 20 and 21. After being crushed the crop is deposited by the swath boards 28 and 29 and 56 respectively in a well defined, airy swath, the swath made by the mowing machine 2 being deposited within the track of the tractor and the swaths from the mowing machines 31 and 32 being deposited at the sides of the tractor. For the mowing machine 2, particularly when cutting a heavy crop, it is very advantageous to deposit the crop in a uniformly built swath so that the crop will not come into contact with the bottom side of the tractor or of the mowing arrangement at the rear of the tractor. Owing to the structure of the intermediate frame 33 and the disposition of the cylinders 62 and 63 the crop can pass unhindered. The construction described in the foregoing provides a swath mower which can be simply attached to a conventional tractor and which has a very large working width. In the combination of the tractor with the mowing machines 2, 31 and 32 an advantageous distribution of weight may be ensured by the weight of the crushing members. The use of a crushing member at the front of the tractor may have a positive effect on the overall working width of the combination. By its disposition the reel has a double function, that is to say it guides the crop to be cut towards the cutter bar 16 and it also guides the crop after cutting from the cutter bar towards the crushing rollers. In order to ensure optimum results of an arrangement having such an appreciable working width two preferably convex mirrors 68 are arranged one on each side of the mowing machine 2, permitting the tractor driver to constantly to observe the mowing operations.

The common drive from the coupling point of the power take-off shaft at the rear of the standard tractor allows the tractor driver to put the mowing machines simultaneously into and out of operation.

Owing to the manner in which the mowing machine 2 is suspended at a short distance in front of the steerable front wheels of the tractor 1, while the lifting device has a frame 9 coupled with the front axle of the tractor so that the lifting device follows the movements of the front axle, the mowing machine 2 will follow the movements of the front axle 10 with respect to the ground, which provides a very satisfactory matching of the ground, while the movements of the mowing machine 2 are independent of the rest of the tractor, particularly of the rear axles, and of the mowing machines 31 and 32.

The mowing machines 31 and 32, coupled to the tractor 1 by the intermediate frame 33, can be pivotable by means of the hydraulic cylinders 62 and 63 into a transport or inoperative position as shown by broken lines in FIG. 4, so that the transport width of the combination can be limited to the width equal to or smaller than that allowed by legal regulations. With the aid of the hydraulic cylinders 62 and 63 the mowing devices 31 and or 32 both can be uncoupled from the intermediate frame 33 in a simple manner. This can be performed with the mowing machines pivoted into the transport position (or, if desired into the working position) by lowering the three-point lifting device 30 until the angle-section members 59 bear on the ground. The members 59 support the mowing arrangement comprising the mowing machines 31 and 32 and the intermediate frame 33 when the intermediate frame 33 is disconnected from the lifting device 30 after removing the pins 35, the support on the ground then being stable. After this disconnection the lifting device is available for other jobs, for example, for the attachment of a pick-up wagon for picking up the swath made by the mowing machine 2. It should be noted that the pick-up wagon may also be attached to the coupling point formed by the tags 67 in the combination shown in FIG. 1.

The intermediate frame 33 is constructed so that one of the mowing machines 31 or 32 can be disconnected by removing the pins 49 and the pin forming the pivotal shaft 66. Thus the combination may comprise only one lateral mowing machine 31 or 32 with or without a front mounted mowing machine 2, the combination thus having one lateral mowing machine 31 or 32 operating on one side, while the combination with three mowing machines as shown in FIG. 1 is always possible.

FIGS. 5 to 10 illustrate a second embodiment of a combination of a tractor, and, a mowing arrangement comprising two mowing machines 69 and 70 and an intermediate frame which are coupled with the three-point lifting device 71 of a standard tractor 72. The tractor 72 has a driver's seat 74 which is adapted to turn about an upright shaft 73, so that during mowing the tractor 72 can be driven in the direction indicated by the arrow A in FIG. 5, the seat being then located out of center, whereas during transport the direction of travel is preferably opposite the direction of the arrow A.

The mowing machines 69 and 70 are fastened to the lifting device 71 by means of coupling points on a three-point trestle 75. The three-point trestle 75 comprises an upper coupling point 76 formed by two upwardly converging strips 77, the lower ends of which are welded to a substantially horizontal beam 78 of the intermediate frame, extending transversely of the direction A. A beam 80, lying parallel to the beam 78, is supported below the beam 78 by two intermediate pieces 79 (FIG. 9). The beam 80 supports the lower coupling points 81 of the trestle 75. To the front of the beam 78 are secured two mutually parallel beams 82 extending away from the beam 78 in direction A, one on each side of and spaced from the vertical, longitudinal plane of symmetry of the mowing arrangement. Near the front ends of the beams 82 a gear box 84 is bolted to these beams by means of corner pieces 83. Beneath the gear box 84 is mounted a mowing member 85 which is a drum mower comprising a conical drum 86 and a circular rotor 87 joined to the bottom of the drum and journalled near the bottom side, the rotor having a plurality of—preferably four—cutting blades 88, mounted for free pivotal movement about upright shafts. The shape of the drum 86 is such that the axis of the cone coincides with the rotary axis of the drum, while the vertex of the cone is located above the gear box 84. In a manner not shown the drum 86 is preferably provided with radially outwardly extending crop-displacing projections. The drum surface preferably has a height of at least fifty centimeters. Between the beams 82, in front of the beam 78, is welded a hollow support 89, which serves as a support for a gear box 90. The gear box 90 is coupled on the rear side, with respect to the direction A, with an auxiliary shaft 91, which, at its end remote from the gear box 90, is connected with the power take-off shaft of the tractor. At the front the gear box 90 has an auxiliary shaft 92, which, at its end remote from the gear box 90, is connected with the gear box 84. The gear box 90 has two lateral outputs connected to auxiliary shafts 93 for driving the mowing machines 69 and 70.

Figure 7:
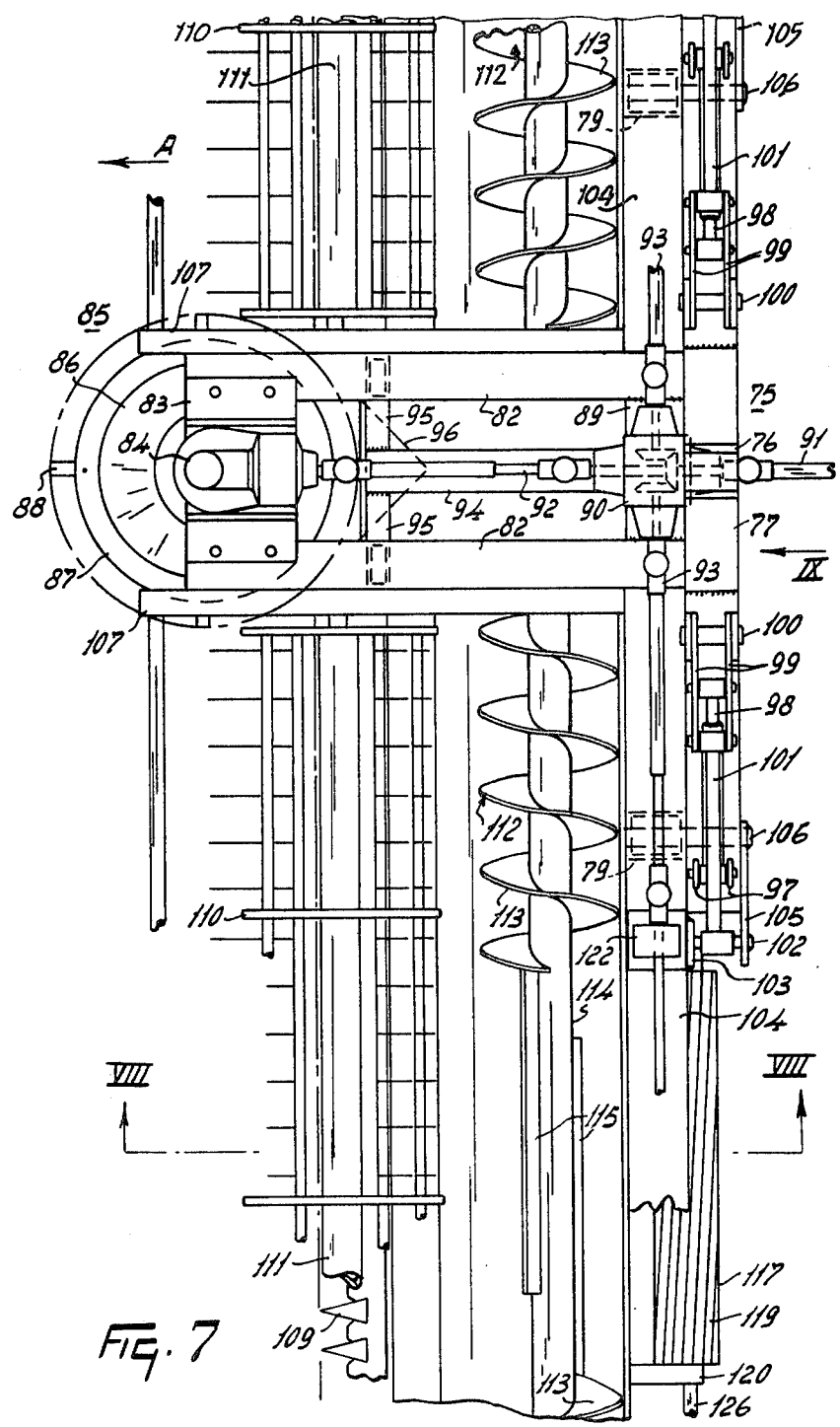
FIG. 7 is an enlarged plan view of part of the combination shown in FIG. 5.

The bottom side of the support 89 is provided with a stay beam 94 which is downwardly inclined in a direction opposite the direction A down to a small distance behind the circular path described by the blades 88, as shown in the plan view of FIG. 7. To the bottom sides of the beams 82 are welded two downwardly converging supports 95 arranged symmetrically and being connected near their lower ends with the suppporting beams 94. Together with the beam 94 the supports 95 constitute a supporting member for supporting the mowing machines on the ground. In order to obtain a smooth bottom side of the supports 95 and of the stay beam 94 a sliding plate 96 is fastened to the bottom sides of the supports 95 and of the beam 94 and bent around the supports 95 and the beam 94.

Since FIGS. 5 to 10 show two mowing machines 69 and 70 which are mirror images of each other only the mowing machine 70 will be described.

The top side of the beam 78 is provided with two upwardly extending tags 97, to which is pivoted a hydraulic cylinder 98. The hydraulic cylinder 98 is pivoted at the end remote from the tags 97 to an intermediate region of an arm formed by mutually parallel strips 99, this arm being pivoted near the lower end to ears 100 provided near the trestle 75 on the top of the beam 78. The strips 99 are upwardly and outwardly inclined from the ears 100 and, viewed on plan as in FIG. 7, they are located one on each side of the cylinder 98. An arm 101 is pivoted to the top ends of the strips 99 and is located above the cylinder 98, this arm 101 being, at least in a working position of the mowing machine 70, substantially parallel to the cylinder 98 and extending from the strips 99 outwardly and downwardly. The end of the arm 101 remote from the strips 99 is pivotable about a shaft 102, which is connected at the front with an ear 103, which is secured at its bottom edge to the rear side of a frame beam 104, the shaft 102 being connected at the rear with a pull rod 105, which is substantially parallel to the strips 99 and rigidly secured at its end remote from the shaft 102 with a pivotal shaft 106. The pivotal shaft 106 is pivotable in a sleeve in the beam 78 and extends forwardly away from the pull rod 105 in the direction A. The pivotal shaft 106 is rigidly secured to the frame beam 104. In this manner the frame beam 104 is pivotable about the shaft 106 in the direction of the arrow B into the position indicated by broken lines in FIG. 9.

Figure 5:
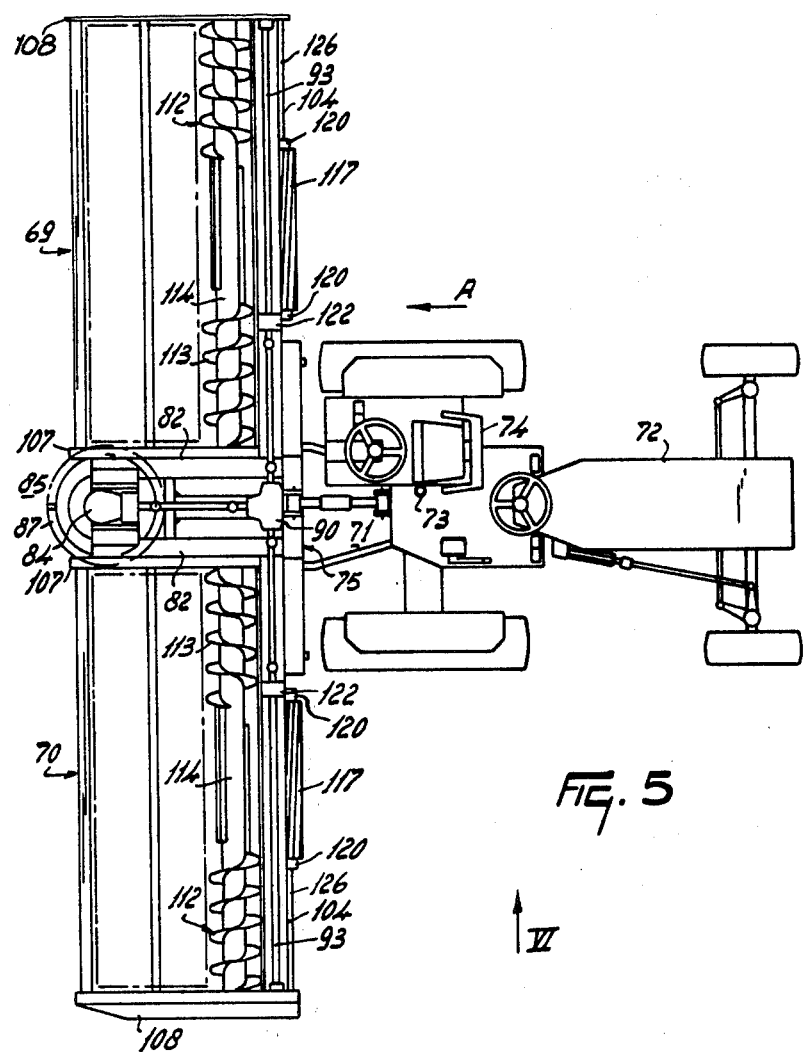
FIG. 5 is a plan view of a second embodiment comprising a tractor in combination with two mowing machines.
Figure 6:
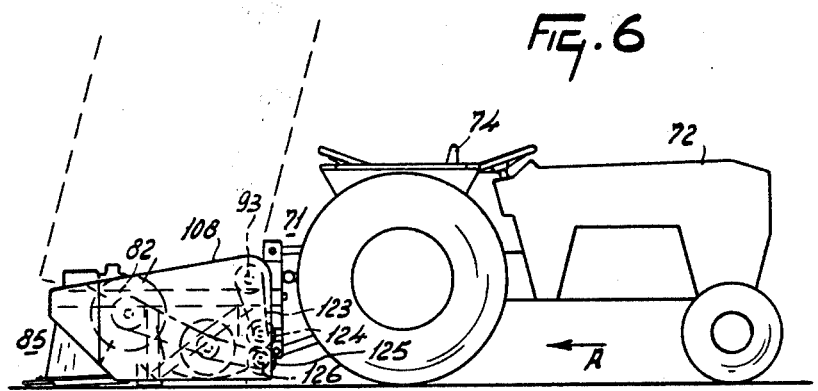
FIG. 6 is a side elevation of the combination as viewed in the direction of the arrow VI in FIG. 5.

The frame beam 104 extends from the hollow beam 82 laterally throughout the width of the mowing machine 70. The frame beam 104 has a function similar to that of the beam 13 and the supporting beam 50 in FIGS. 1 to 4, that is to say, the function of holding parts of the mowing machine 70. Near the end of the hollow beam 82 a wall 107 is connected to the front of the beam 104, whereas near the outermost end the beam 104 is connected to a wall 108 (FIG. 5). At the front the wall 108 terminates in a crop divider. At the front the mowing device is provided with an at least substantially horizontal cutting element in the form of a cutter bar 109, extending transversely of the direction A and having substantially horizontally reciprocatory cutters. Above the cutter bar 109 a reel 110 is mounted for rotation about a rotary shaft 111, journalled in bearings in the walls 107 and 108. Behind the cutter bar 109, near the rear of the mowing machine, a worm conveyor 112 extends transversely of the direction A. The worm conveyor 112 is journalled in the walls 107 and 108 and comprises a helical conveyor 113 extending from one side of the mowing machine 70 towards the center thereof and ending at a portion 114 of the worm conveyor having substantially radially extending plates 115. The portion 114 is located in front of a crushing member 116 comprising two crushing rollers 117 and 118 having helical ribs 119 at their outer circumferences, the surface being preferably made from rubber, but may be made from other materials. The rollers 117 and 118 are urged towards one another by spring force. The rollers 117 and 118 have a width approximately equal to that of the portion 114 between the helical conveyors 113, this width being about 1 meter to 1.20 meters. The rollers 117 and 118 are journalled on either side in supports 120, fastened to the bottom of the beam 104 and being downwardly and rearwardly inclined from the beam 104. FIG. 8 shows that the rollers 117 and 118 are located perpendicularly one above the other. The mowing machine 70 has a platform 121 (FIG. 8), which is located between the walls 107 and 108 and extends rearwardly from the cutter bar 109, the platform curving around the worm conveyor 112 and near the rear part at least partly around the roller 118.

The mowing machine 70 is driven from the gear box 90 by the laterally extending shaft 93, which passes near the ear 103 through a support 122 and near the outer side of the mowing machine into a transmission casing formed by the wall 108. As is shown schematically in FIG. 6, the movement of the shaft 93 is transferred through a pulley and a belt transmission 123 to a gear 124, which drives a gear 125. The gears 124 and 125 drive shafts 126, which extend from the wall 108 substantially parallel to the shaft 93 in the direction of the rollers 117 and 118, which are thus driven. With the aid of a belt transmission the worm conveyor 112 and the reel 110 are driven from a pulley on the shaft 126 which pulley is fixed to a gear 125. From said place the cutter bar 109 is driven in known manner (not shown).

As shown in FIG. 10, the mowing machine 70 may comprise, instead of the crushing member 116, a crushing member 127 having a driven shaft 128, radial plates 129 being fastened to said shaft 128. The plates 129 are provided with freely pivotable clappers 130. The path described by the clappers 130 in the direction of the arrow D is enclosed at the top by a screening hood 131. The distance between the clappers 130 and the screening hood 131 is such that, in use, the crop is crushed between the hood 131 and the clappers 130.

The mowing machine shown in FIGS. 5 to 10 operates as follows.

In operation the two mowing machines 69 and 70 occupy the position shown in FIG. 5 and are coupled to the lifting device 71 of the tractor 72, which is driven in the direction of the arrow A. It should be noted that the tractor preferably is of a conventional, series-production, commercial type like the tractor 1 of the first embodiment; it requires no further means for moving the mowing machines than those provided in the factory on a standard tractor.

The reciproactory cutter of the cutter bar 109, the reel 110 and the worm conveyor 112 located behind the cutter bar 109 are driven from the power take-off shaft of the tractor via the auxiliary shaft 91, the gear box 90, the auxiliary shaft 93 and the transmission in the wall 108. During the movement of the mowing machines 69 and 70 the crop is cut by the cutter elements 109 of the two neighboring mowing machines and is guided by the reels 110 towards the worm conveyor 112 arranged behind each cutter element. These worm conveyors 112 convey the crop of each mowing machine towards the center and rearwardly to the crushing members 116, which crush the crop by means of the two pressurized rollers 117 and 118 rotating in opposite senses, the crop being slightly crushed during this passage and being deposited in an airy swath. Thus, as is shown in FIG. 5, the crop is deposited in swaths to each side of the tractor 72. Instead of using the crushing member 116, it is alternately possible to use the crushing member 127 with the pivotable clappers 130, above which the screening hood 131 is located. The crushing member 127 (FIG. 10) also crushes the cut crop lightly and deposits it in an airy, slightly tedded swath, which may be very advantageous under certain conditions.

The pivotable seat 74 of the tractor 72 permits the tractor driver to drive in the direction A in an ergonomically suitable manner and by turning the seat about the shaft 73 for transport purposes the driver can drive in a direction opposite the arrow A.

Between the mowing machines 69 and 70 is located the mowing member 85, which works the strip between the cutter bars 109 with a slight overlap. The conical drum 86 and the rotor 87 displace the cut crop laterally and slightly to the rear towards one of the cutter bars 109 so that also the crop cut between the mowing machines 69 and 70 is crushed by one of the crushing members 116. In a manner not shown it is possible by selecting the direction of rotation of the mowing member 85 to displace the crop towards the left-hand or the right-hand cutter bar. The lateral displacement of the cut crop can be further improved by giving an appropriate shape to the sheath of the drum 86, for example, by providing it with means such as radial ridges.

The combination of the mowing machines 69 and 70 and of the mowing member 85 has an overall working width 6 to 7 meters, preferably about 6.5 ms. In order to ensure a satisfactory matching of the ground the mowing machines 69 and 70 are adapted to pivot in operation about the shafts 106 and at the center the arrangement is supported by the sliding plate 96. Despite the ability of the mowing devices 69 and 70 to turn through an angle of at least 90° relatively to one another, the strip located between the mowing machines is worked to the optimum by the element 85 so that apart from a satisfactory adaptation to the ground the arrangement has a satisfactory, continuous mowing effect across the whole working width. By means of the hydraulic cylinders 98 either or both of the mowing machines 69 or 70 can be moved into a substantially vertical transport or inoperative position as shown in FIG. 9, the arrangement then having a transport width which is smaller than the width of the tractor. If desired, fastening means (not shown) can be provided to fix the mowing machines in the transport position. In the transport position one or both mowing machines can be lowered to the ground, to rest on the horizontal surfaces of the then horizontal walls 107, and be disengaged. In the working position the mowing machines 69 and 70 bear with the beam 104 and the wall 107 downwards in a direction opposite the arrow B (FIG. 9) on the associated beam 82, which thus forms a stop. In this way damage to the lifting cylinders 98 and to the associated lifting arms and the auxiliary shaft 93 is avoided.

The application is not limited to what is stated in this description, but also covers the figures and the details given in the claims.

Having described my invention, what I claim as new and desire to secure by Letters Patent of the United States:

1. A mowing machine comprising a frame extending transverse to the operative direction of travel and coupling means at the rear of said frame with respect to the machine's operative direction of travel, said coupling means adapted to be connected to a coupling device mounted on the front of an agricultural tractor, the machine comprising at least two groups of cutting means at the forward end thereof which are supported on said frame, said groups of cutting means comprising mowing units at least one of which is rotatable about a substantially vertical axis, the width of the working area of said groups of cutting means extending in excess of the width of said tractor on both sides thereof, movable conveyor means being supported on said frame to extend laterally of the machine behind said cutting means, driving means connected to operate said cutting means and said conveyor means to displace cut crop from said cutting means into two discharge areas of said conveyor means, each said discharge area having a width which is smaller than the width of each of said groups of cutting means on both sides of said tractor, each said discharge area being located to discharge cut crop therefrom on a side relative to the tractor as seen in the operative direction of travel proximate a wheel of said tractor, a crushing device being connected with said driving means and being located immediately behind each said discharge area of said conveyor means, each said crushing device adapted to form a swath of cut crop, wherey a swath of cut crop is formed at each side of the tractor.

2. A mowing machine as claimed in claim 1, wherein two further said mowing units comprise corresponding reciprocating cutter bars and said rotatably mounted mowing unit is positioned between said bars.

3. A mowing machine as claimed in claim 2, wherein each of said two mowing units includes a worm conveyor and a crushing device that are located to the rear of the corresponding said cutter bar.

4. A mowing machine as claimed in claim 3, wherein said rotatably mounted mowing unit is a conical drum mower.

5. A mowing machine as claimed in claim 4, wherein an intermediate portion of said frame mounts said coupling means and each of said two mowing units is directly connected to said intermediate portion.

* * * * *